2,885,404
ORGANIC COMPOUNDS

Vladimir Petrow, Oliver Stephenson, and Anthony Musgrave Wild, London, England, assignors to The British Drug Houses Limited, London, England, a British company No Drawing. Application December 27, 1956
Serial No. 630,754

Claims priority, application Great Britain
January 4, 1956

13 Claims. (Cl. 260—294.3)

This invention is for improvements in or relating to organic compounds and has particular reference to new esters of diethylphenylacetic acid.

It is an object of the present invention to provide new esters of diethylphenylacetic acid which are of value on account of their physiological properties and methods for the preparation of the new esters having the general Formula IV below.

It is a further object of the present invention to provide an improved route for the preparation of the intermediate diethylphenylacetic acid having the formula Ph.CEt₂COOH (III) from the commercially-available phenylacetonitrile Ph.CH₂.CN (I).

We have found that β-dialkylaminoethoxyethyl esters of diethylphenylacetic acid having the general Formula IV below possess valuable physiological properties and in particular are able to suppress the cough reflex. This valuable property has not hitherto been encountered in any ester of diethylphenylacetic acid recorded in the literature.

The invention provides new dialkylaminoethoxyethyl esters of diethylphenylacetic acid having the general formula Ph.CEt₂COO.CH₂.CH₂.O.CH₂.CH₂.N.R.R'     (IV)

in which R and R' are alkyl groups containing together not more than 12 carbon atoms, or together form a cyclic structure wherein —NRR' represents pyrrolidino, piperideino or piperidino. The groups R and R' may be the same or different.

In particular the invention provides the new compounds 2-(β-diethylaminoethoxy)ethyl diethylphenylacetate, 2-(β-N-pyrrolidino ethoxy)ethyl diethylphenylacetate, 2-(β-N-piperidinoethoxy)ethyl diethylphenylacetate, 2-(β-N-Δ³-piperideinoethoxy)ethyl diethylphenylacetate, 2-(β-N-ethylmethylaminoethoxy)ethyl diethylphenylacetate, 2-(β-N-ethylpropylaminoethoxy)ethyl diethylphenylacetate, 2-(β-N-di-n-butylaminoethoxy)ethyl diethylphenylacetate and 2-(β-di-n-hexylaminoethoxy)ethyl diethylphenylacetate.

According to the present invention there is provided a method for the preparation of dialkylaminoethoxyethyl esters of diethylphenylacetic acid having the general Formula IV above, which method comprises converting diethylphenylacetic acid into the corresponding acid halide and condensing the resulting halide with the appropriate dialkylaminoethoxyethyl alcohol.

The invention further provides a method for the preparation of dialkylaminoethoxyethyl esters of diethylphenylacetic acid having the general Formula IV above which method comprises converting diethylphenylacetic acid into the corresponding β-halogeno-ethoxyethyl ester having the general formula Ph.CEt₂.COO.CH₂.CH₂.O.CH₂.CH₂.Hal     (V)

and reacting the β-halogeno-ethoxyethyl ester with the appropriate amine NHRR' where R and R' have the same meaning as above.

Conversion of diethylphenylacetic acid (III) into the β-halogeno-ethoxyethyl ester (V) may be conveniently effected by reacting a metal salt of diethylphenylacetic acid (III), such as for example an alkali metal salt e.g. the sodium salt, with a ββ'-dihalogeno-ethyl ether.

The invention also provides an improved method for the preparation of diethylphenylacetic acid (III) from phenylacetonitrile (I) which method comprises treating a di-alkali metal derivative of phenylacetonitrile in liquid ammonia with an ethyl halide to form diethylphenylacetonitrile Ph.CEt₂.CN (II) and hydrolysing the diethylphenylacetonitrile.

The di-alkali metal derivative of phenylacetonitrile (I) in liquid ammonia may be treated with not less than 2 molar equivalents of an ethyl halide to give diethylphenylacetonitrile (II).

The di-sodium derivative of phenylacetonitrile is the preferred di-alkali metal derivative of phenylacetonitrile (I).

Ethyl chloride is the preferred ethyl halide.

Hydrolysis of diethylphenylacetonitrile (II) to diethylphenylacetic acid (III) may be effected by employing a strong mineral acid at a raised temperature, for example with 45 percent v./v. sulphuric acid under reflux, or by employing alkalies at a raised temperature, for example by heating with 25 percent w./v. solution of potassium hydroxide in diethylene glycol under reflux.

Following is a description by way of example of methods of carrying the invention into effect.

EXAMPLE 1

*2-(β-diethylaminoethoxy)ethyl diethylphenylacetate*

*diethylphenylacetonitrile*

Sodium (25 g.) was dissolved in liquid ammonia (300 ml.) containing 0.3 g. ferric chloride and phenylacetonitrile (59 g.) added slowly with stirring. After about 15 minutes a cooled solution of ethyl chloride (80 g.) in dry ether (200 ml.) was added and the mixture stirred for 1 hour. The ammonia was then allowed to evaporate, water added and the ether layer separated, dried, concentrated and the residual oil distilled in vacuo to yield diethylphenylacetonitrile as an oil, B.P. 85° C./1 mm.

*Diethylphenylacetic acid*

(III)

The foregoing nitrile (46 g.) was added to ethylene glycol (140 ml.) containing potassium hydroxide (36 g.) and the mixture refluxed with stirring for about 20 hours. The mixture was diluted with water, extracted with light petroleum (B.P. 60 to 80° C.) to remove traces of impurities and then acidified to yield diethylphenylacetic acid which was recrystallised from dilute ethanol (40% v./v. ethanol in water).

*2-(β-chloroethoxy)ethyl diethylphenylacetate*

The foregoing acid (19.2 g.) was added to a solution of sodium hydroxide (4 g.) in ethylene glycol (40 ml.). ββ'-Dichlorodiethyl ether (28.6 g.) was added and the mixture refluxed for 1 hour. After removal of solvent under reduced pressure, water (150 ml.) was added to the residue and the product extracted with ether. The ethereal solution was dried, concentrated and the residue distilled in vacuo to yield the product as an oil, B.P. 140° C./0.7 mm.

*2-(β-diethylaminoethoxy)ethyl diethylphenylacetate*

(IV; R=R'=Et)

A mixture of 2-(β-chloroethoxy)ethyl diethylphenylacetate (21 g.) and diethylamine (14 g.) was heated under pressure in a sealed tube at 140° C. for 5 hours. After cooling, the mixture was dissolved in dilute hydrochloric acid and extracted with ether to remove traces of neutral impurities. The acid layer was then made alkaline with 10% w./v. sodium hydroxide solution with cooling, and re-extracted with two portions of ether. The ether extract was dried, the ether distilled off and the residue distilled in vacuo to yield the product as an oil, B.P. 140° C./0.1 mm.

EXAMPLE 2

2-(β-N-pyrrolidinoethoxy)ethyl diethylphenylacetate diethylphenylacetyl chloride Diethylphenylacetic acid (15 g.) was refluxed with pure thionyl chloride (50 ml.) for 1 hour. After removal of unchanged thionyl chloride by distillation under reduced pressure the residue was fractionated in vacuo to yield the product as an oil, B.P. 134 to 135° C./15 mm.

2-(β-N-pyrrolidino ethoxy)ethyl diethylphenylacetate

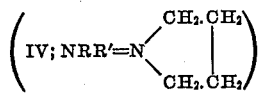

Diethylphenylacetyl chloride (16 g.) dissolved in pure dry chloroform (20 ml.) was treated with a solution of 2-(β-N-pyrrolidino ethoxy) ethanol (13.5 g.) in pure dry chloroform (15 ml.) and the mixture heated under reflux for 30 minutes. The chloroform was distilled off, the cooled residue was dissolved in dilute hydrochloric acid and the solution was extracted with ether to remove any non-basic material. The acid extract was cooled to 0 to 5° C. and adjusted to pH 10 with 10 percent potassium hydroxide solution. The separated oil was extracted thrice with ether, the ether extracts dried with anhydrous sodium sulphate and the ether removed by distillation.

The residual oil was distilled in vacuo to yield the product, B.P. 168 to 170° C./0.1 mm.

EXAMPLE 3

2-(β-N-pyrrolidinoethoxy) ethyl diethylphenylacetate

A mixture of 2-(β-chloroethoxy) ethyl diethylphenylacetate prepared as described in Example 1 (30 g.) and pyrrolidine (20 g.) was heated under reflux for 3 hours. It was then cooled, poured into a slight excess of 2 N. hydrochloric acid and non-basic impurities removed by extraction with ether. The aqueous acidic layer was made alkaline with 10% w./v. aqueous sodium hydroxide with cooling and the separated oil extracted with ether. The ether extract was dried, the ether distilled off and the residue distilled in vacuo to yield 2-(β-N-pyrrolidinoethoxy)ethyl diethylphenylacetate product as an oil, B.P. 170° C./1.0 mm.

EXAMPLE 4

2-(β-N-piperidinoethoxy)ethyl diethylphenylacetate

This was prepared exactly as for the pyrrolidino analogue in Example 3 using 2-(β-chloroethoxy) ethyl diethylphenylacetate (20 g.) and piperidine (30 g.) and heating under reflux for 1 hour.

The free base 2-(β-N-piperidinoethoxy)ethyl diethylphenylacetate was obtained as an oil, B.P. 160 to 170° C./0.5 mm.

Treatment of the free base with an equivalent of citric acid in ethyl acetate solution yielded the citrate salt which had M.P. 73° C. after two further crystallisations from ethyl acetate.

EXAMPLE 5

2-(β-N-Δ³-piperideinoethoxy) ethyl diethylphenylacetate

This was prepared exactly as for the piperidino analogue described in Example 4. The citrate had M.P. 80° C. after two recrystallisations from ethyl acetate.

EXAMPLE 6

2-(β-N-ethylmethylaminoethoxy) ethyl diethylphenylacetate

A mixture of 2-(β-chloroethoxy) ethyl diethylphenylacetate (25 g.), prepared as described in Example 1, ethylmethylamine (30 ml.) and n-hexanol (200 ml.) was heated under reflux for 6 hours when excess of hexanol and ethylmethylamine were removed by steam distillation. The residue was acidified with a slight excess of 2 N. hydrochloric acid and extracted with ether to remove non-basic material. The aqueous acidic fraction was then made alkaline with aqueous sodium hydroxide with cooling and the resultant oil extracted with ether. The ether extract was dried, the ether distilled off and the residual oil distilled in vacuo to yield 2-(β-N-ethylmethylaminoethoxy)ethyl diethylphenylacetate as an oil of B.P. 140° C./0.5 mm.

EXAMPLE 7

2-(β-N-ethylpropylamino ethoxy) ethyl diethylphenyl acetate

This was prepared as in the previous example using ethylpropylamine in place of ethylmethylamine and heating the mixture under reflux for 20 hours.

2-(β-N-ethylpropylaminoethoxy)ethyl diethylphenylacetate was obtained as an oil of B.P. 150 to 160° C./0.2 mm.

EXAMPLE 8

2-(β-N-di-n-butylamino ethoxy) ethyl diethylphenylacetate

A mixture of 2-(β-chloroethoxy) ethyl diethylphenylacetate (20 g.), prepared as described in Example 1, di-n-butylamine (30 g.) and n-hexanol (80 ml.) was heated under reflux for 20 hours then the hexanol and excess of dibutylamine were removed by steam distillation.

The residue was made alkaline directly and extracted with ether. The ether extracts were dried, the ether removed and the residual oil distilled in vacuo to yield 2-(β-N-di-n-butylaminoethoxy)ethyl diethylphenylacetate as an oil of B.P. 164 to 174° C./1.0 mm.

EXAMPLE 9

2-(β-N-di-n-hexylaminoethoxy)ethyl diethylphenylacetate

A mixture of 2-(β-chloroethoxy)ethyl diethylphenylacetate (20 g.) (prepared as described in Example 1), di-n-hexylamine (35 g.) and n-hexanol (40 ml.) was heated under reflux for 2 hours. The mixture was carefully acidified with 2 N. hydrochloric acid and the hexanol removed by steam distillation. The residual clear aqueous solution was made alkaline with 10% w./v. aqueous sodium hydroxide and the separated oil extracted with ether. The ether extract was dried, the ether removed and the residue distilled at 1 mm. to remove di-n-hexylamine, when 2-(β-N-di-n-hexylaminoethoxy) ethyl diethylphenylacetate was isolated by distillation at 0.03 mm., being obtained as an oil of B.P. 190° C.

We claim:

1. Dialkylaminoethoxyethyl esters of diethylphenylacetic acid having the general formula

in which R and R' are alkyl groups containing together up to 12 carbon atoms.

2. 2-(β-diethylaminoethoxy)ethyl diethylphenylacetate.

3. 2-(β-N-pyrrolidino ethoxy)ethyl diethylphenylacetate.

4. 2-(β-N-piperidinoethoxy)ethyl diethylphenylacetate.

5. 2-(β-N-Δ³-piperideinoethoxy)ethyl diethylphenylacetate.

6. 2-(β-N-ethylmethylaminoethoxy)ethyl diethylphenylacetate.

7. 2-(β-N-ethylpropylaminoethoxy)ethyl diethylphenylacetate.

8. 2-(β-N-di-n-butylaminoethoxy)ethyl diethylphenylacetate.

9. 2-(β-di-n-hexylaminoethoxy)ethyl diethylphenylacetate.

10. A method for the preparation of dialkylaminoethoxyethyl esters of diethylphenylacetic acid having the general formula Ph.CEt$_2$COO.CH$_2$.CH$_2$.O.CH$_2$.CH$_2$.N.R.R' in which R and R' are alkyl groups containing together up to 12 carbon atoms said method comprising reacting an alkali metal salt of diethylphenylacetic acid with a ββ'-dihalogeno-ethyl ether to convert said acid into the corresponding β-halogeno-ethoxyethyl ester having the general formula Ph.CEt$_2$COO.CH$_2$.CH$_2$.O.CH$_2$.CH$_2$Hal and reacting the β-halogeno-ethoxyethyl ester with the appropriate amine NHRR' where R and R' have the same meaning as above.

11. Substituted aminoethoxyethyl esters of diethylphenylacetic acid having the general formula Ph.CEt$_2$COO.CH$_2$.CH$_2$.O.CH$_2$.CH$_2$.N.R.R' in which NRR' is an amine moiety derived from an amine selected from the group consisting of pyrrolidine, piperideine, piperidine, and the dialkylamines containing together up to 12 carbon atoms in the two alkyl groups.

12. A method for the preparation of substituted aminoethoxyethyl esters of diethylphenylacetic acid having the general formula Ph.CEt$_2$COO.CH$_2$.CH$_2$.O.CH$_2$.CH$_2$.N.R.R' in which NRR' is an amine moiety derived from an amine selected from the group consisting of pyrrolidine, piperideine, piperidine, and the dialkylamines containing together up to 12 carbon atoms in the two alkyl groups, said method comprising reacting an alkali metal salt of diethylphenylacetic acid with a ββ'-dihalogeno-ethyl ether to convert said acid into the corresponding β-halogeno-ethoxyethyl ester having the general formula Ph.CEt$_2$COO.CH$_2$.CH$_2$.O.CH$_2$.CH$_2$Hal and reacting the β-halogeno-ethoxyethyl ester with the appropriate amine NHRR' wherein —NRR' has the same meaning as defined above.

13. A method as claimed in claim 12 wherein the diethylphenylacetic acid is converted into the corresponding β-chloro-ethoxyethyl ester by reacting a sodium salt of diethylphenylacetic acid with ββ'-dichloro-ethyl ether.

References Cited in the file of this patent

UNITED STATES PATENTS

| | | |
|---|---|---|
| 2,219,796 | Viand | Oct. 29, 1940 |
| 2,399,506 | Pierce | Apr. 30, 1946 |
| 2,517,091 | De Groote et al. | Aug. 1, 1950 |
| 2,517,856 | Elkinton et al. | Aug. 8, 1950 |
| 2,526,108 | Arnold | Oct. 17, 1950 |
| 2,647,904 | Rey-Bellet | Aug. 4, 1953 |

OTHER REFERENCES

Tilford et al.: J. Am. Chem. Soc., vol. 69, pp. 2902–6 (1947).